United States Patent [19]

Zinner

[11] 4,162,697
[45] Jul. 31, 1979

[54] REMOVABLE ANTISKID DEVICE ON A VEHICLE WHEEL, IN PARTICULAR, AN AUTOMOBILE WHEEL

[76] Inventor: Peter Zinner, CH-3901 Termen, Switzerland

[21] Appl. No.: 821,524

[22] Filed: Aug. 3, 1977

[51] Int. Cl.² .................... B60C 27/00; B60C 27/02
[52] U.S. Cl. ............................. 152/217; 152/225 R
[58] Field of Search ........................... 152/217–219, 152/221, 223, 225, 226, 230

[56] References Cited

U.S. PATENT DOCUMENTS

| | | | |
|---|---|---|---|
| 2,065,810 | 12/1936 | Karon | 152/225 R |
| 2,176,631 | 10/1939 | Kunkle | 152/217 |
| 2,315,838 | 4/1943 | Bryon | 152/225 R |
| 2,574,327 | 11/1951 | Grady et al. | 152/217 |
| 2,783,812 | 3/1957 | Chmela | 152/223 |
| 3,088,511 | 5/1963 | Myers | 152/217 |
| 3,186,467 | 6/1965 | Treiber, Jr. | 152/226 |

FOREIGN PATENT DOCUMENTS 1004949  3/1957  Fed. Rep. of Germany ........... 152/217

Primary Examiner—Albert J. Makay
Assistant Examiner—Lawrence E. Williams
Attorney, Agent, or Firm—Darbo & Vandenburgh

[57] ABSTRACT

Two parts are used each of which grips a respective, opposite wheel segment, much in the manner of a cowl. Each part includes a straight strip which lies against the outside of the wheel and a shorter straight strip which lies against the inside of the wheel. The adjacent ends of the inner and outer strips are connected by chains or by bands as are intermediate portions of the strips. The two outer strips are releasably connected on the outside of the wheel by diverse types of connections. In some embodiments, each part includes a bow lying against the outside of the wheel and connecting the ends of the outer strip of that part.

8 Claims, 4 Drawing Figures

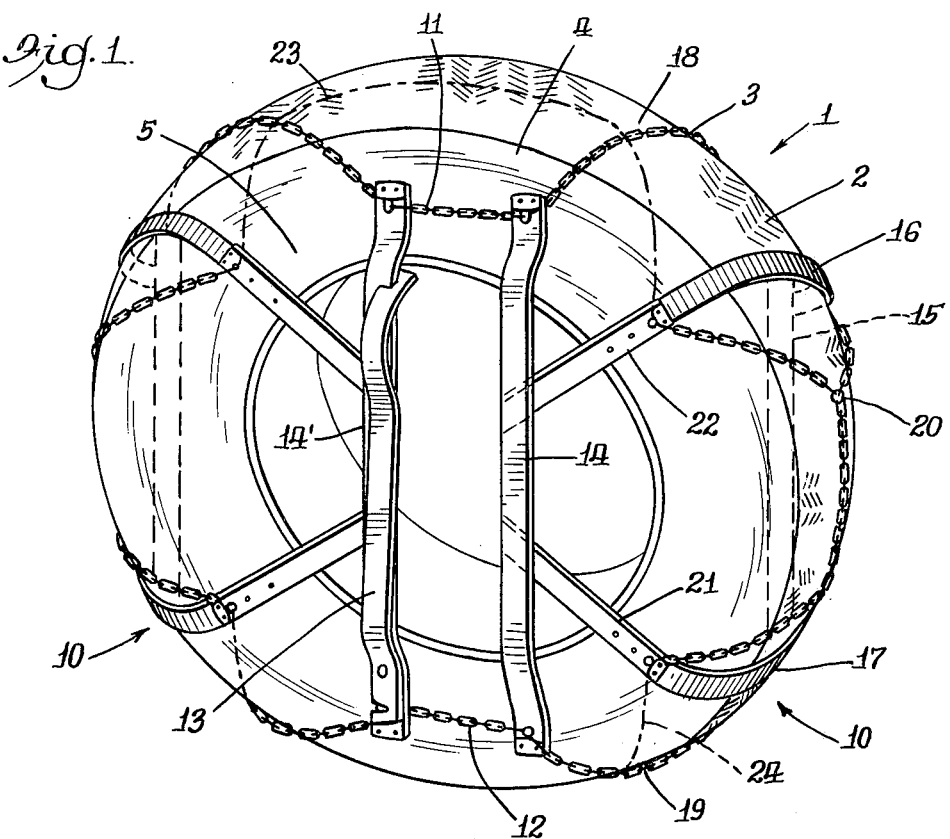
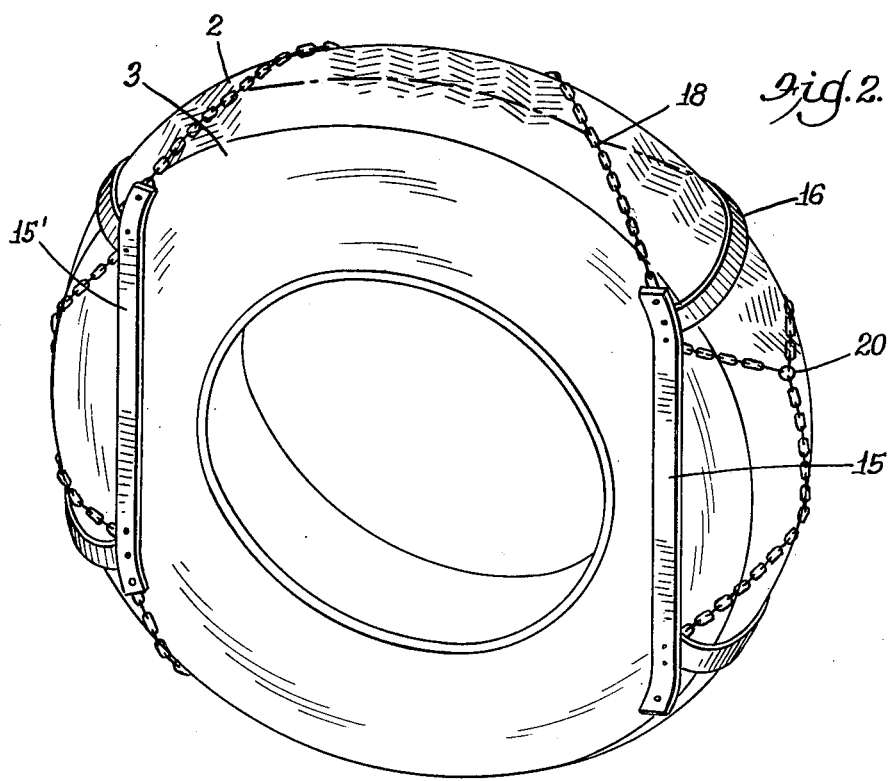

REMOVABLE ANTISKID DEVICE ON A VEHICLE WHEEL, IN PARTICULAR, AN AUTOMOBILE WHEEL

BACKGROUND AND SUMMARY OF THE INVENTION

The invention relates to a removable antiskid device on vehicle wheel, in particular an automobile wheel.

Such an antiskid device is also called skid security or tire chains. It prevents slipping or skidding of a vehicle, in particular of the pneumatic tire of an automobile wheel, on ice, snow, slush or soft ground.

A known antiskid device is the ordinary tire chain, the mounting of which on the automobile wheel, however, is difficult and time-consuming. For a simpler mounting antiskid device there has been proposed a clamping shoe with arms lying in star form to one another, the ends of which grip in hook form about the outer shoulder of the wheel. Further, there were proposed cage shells for radial emplacement on a wheel.

The known antiskid devices usable on wheels which do not have conveniently located openings have the disadvantage of being cumbersome, heavy and unhandy. The storage of these antiskid devices when not in use, for example in the trunk space of an automobile requires, accordingly, substantial space.

Moreover, the mounting of the heavy and unwieldy antiskid device is laborious and its manufacture expensive. A further problem is the influence of the known antiskid device on the traveling behavior of the vehicle. A sufficient security against skidding and lateral movement of a wheel provided with one of the known antiskid devices cannot be achieved without appreciable impairment of the running smoothness of the wheel.

Underlying the invention is the problem of providing a simply mountable, light, cheap and handy antiskid device which provides good security against skidding and slide-slipping with comparatively slight impairment of the running smoothness.

According to the invention, this is achieved by the means that the antiskid device has two parts gripping around two opposed wheel segments, each of which parts consists of a strip lying against the inside of the wheel, the length surface the inside strip being less than the diameter of the wheel, and two bands and/or chains crossing the running surfaces of the wheel and lying against it, and has connecting means on the outside of the wheel, which joins the bands and/or chains of the two parts in pairs, at least one connecting means being releasable for the removal of the parts.

Each part has preferably a second strip lying on the outside of the wheel, the length of which is less than the diameter of the wheel but greater than the length of the first strip, the two strips of each part running parallel to one another and being joined with one another by the bands and/or chains. At the ends of the second strip bows can be fastened which lie against the outer shoulder of the wheel. The strips and the bands are expediently constructed flat. Further, the bands are preferably flexible and dimensioned in such a way that the ends of the strip lie against the wheel shoulders.

DESCRIPTION OF THE DRAWINGS

FIG. 1 is perspective view of the front side of an automobile wheel with an embodiment of a removable antiskid device of the present invention thereon;

FIG. 2 is a rear view of the wheel and embodiment of FIG. 1;

DESCRIPTION OF SPECIFIC EMBODIMENTS

Figure 3:
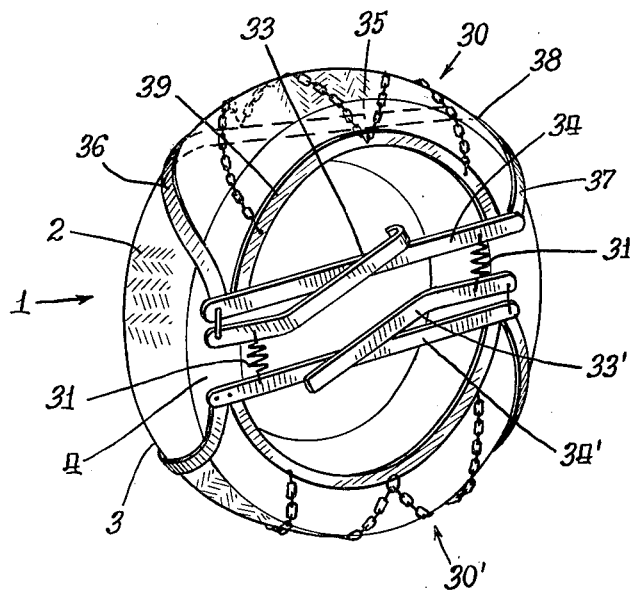
FIG. 3 is a perspective view of a second embodiment of the invention.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The antiskid devices of FIGS. 1 and 2 is mounted on a wheel of an automobile, of which there is represented merely the tire 1. The tire 1 has a running surface (tread) 2, an inner shoulder 3 (closest to the automobile body), an outer shoulder 4 (farthest from the body) and side surfaces of which only the outer side surface 5 is normally visible.

The antiskid device has two parts 10 and 10', similar to one another, which grip the tire 1 in the manner of a cowl. The parts 10 and 10' are detachably joined together by connecting links in the form of chains or straps 11 and 12. The connecting link 11 is adjustable in its length to compensate for variations in the wheel diameter. The connecting link 12 is connected to a swingable lever 13. Lever 13 is pivotally connected by a pin to outer strip 14' and its end opposite link 12 has a hook by which it can engage strip 14'. The lever 13 is snapped in place or hooked on the strip 14' after link 12 is tensioned.

The part 10 consists of two parallel strips 14 and 15 of different length, which are joined with one another by two bands 16 and 17 and chains 18 and 19. The shorter strip 15 lies against the inside of the wheel, the longer strip 14 on the outside of the wheel. The length of the shorter strip corresponds approximately to the radius of the tire and the length of the longer strip 14 is about five-sixths of the diameter of the tire. The outer strip should be at least approximately two-thirds the wheel diameter in length. The bands 16 and 17 are of flexible material, for example plastic, and are firmly joined (as for example riveted) with the strip 15, and, through the intermediate pieces 21 and 22, with the strip 14. The bands 16 and 17 and the strips 14 and 15 are thin, i.e., their width is a multiple of their heights or thicknesses. The length of the bands 16 and 17 and the length of the chains 18 and 19 are chosen so that when the antiskid device is mounted the strip 14 reaches to the shoulder 4 and the strip 14 to the shoulder 3 of the tire.

Additional chains 20 are fastened to the strips 14 and 15, detachably or permanently. The chains 20 are dimensioned in such a way that when part 10 is mounted they lie loosely on the tread 2 of the tire 1. Two further additional chains 23 and 24 can be mounted according to need (dot-and-dashed lines, FIG. 1).

The mounting of the antiskid device on the automobile wheel takes place by setting the two parts 10 and 10' on the tire 1. There, both parts are laid laterally over the wheel until the strips 15 and 15' slide behind the tire. With lever 13 unhooked from strip 14' and pivoted counterclockwise from the position illustrated, the chain 12 is then fastened to the lever 13. The lever is then pivoted clockwise to tension chain 12 and the lever is then hooked on the strip 14'.

The embodiment of FIG. 3 has two parts 30, 30' like one another with strips 34, 35 and bands 36, 37, similar to those of parts 10, 10' in FIGS. 1 and 2. The longer strip 34 lies against the outside of the wheel and has a circular bow 39 fastened to its ends. The bow lies on the outer shoulder 4 of the tire 1. Chains 38 are fastened on the bow 39 and the shorter strip 35 lying against the inside of the wheel. Chains 38 cross the tread 2 of the tire and lie loosely against it. A lever 33 is swingably secured on the end of the outer strip 34 to which the band 36 is fastened. Springs 31 connect the levers 33 and 33' with the other strips 34' and 34 respectively. The free end of the lever 33 is bent over and hooks in place on the strip 34, the spring force of the spring 31 holding the lever 33 in hooked position. The elements of part 30' correspond to those of part 30, as just described, but have a prime after the respective number.

To remove the two parts 30, 30' of the antiskid device, the levers 33, 33' are unhooked and swung toward the wheel axle (clockwise in FIG. 3). Thereupon the two parts 30, 30' can be taken off the wheel, in which operation, in contrast to the parts 10 and 10' of the antiskid device according to FIG. 1, they are not completely separated from one another, but remain joined by the springs 31, 31'. The antiskid device is replaced by performing those manipulations in the reverse order.

Part 40 of this embodiment has an outer strip 44 with a bow 49, bands 46, 47 and chains secured thereto. An inner strip 45 is attached to the bands 46, 47 and the chains. Part 40' has corresponding components. Like the FIG. 3 embodiment, a lever 43 is swingably secured to strip 44 and is connected by a spring to strip 44' of part 40'. However, part 40' does not have a corresponding lever; but instead a connecting member or link 42 connects strips 44 and 44' adjacent the other ends of the strips (the upper ends in FIG. 4).

Figure 4:
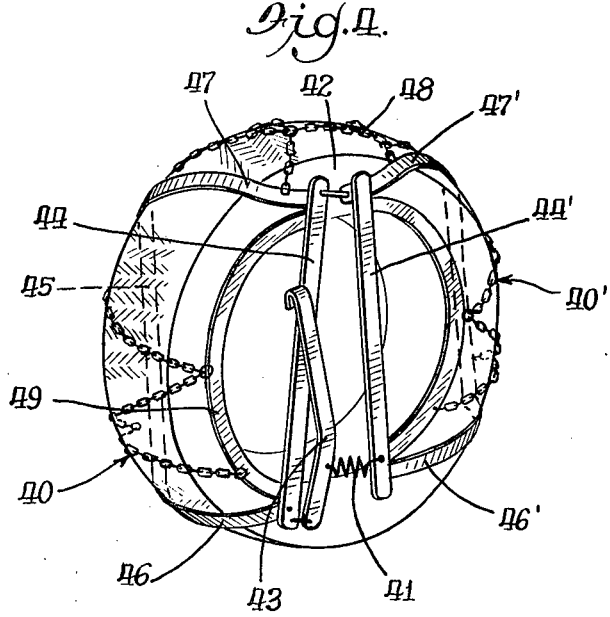
FIG. 4 shows a variant of the embodiment of FIG. 3.

The springy connection of the two parts of the antiskid device according to FIGS. 3 and 4 makes possible swinging movements of the antiskid device parts against one another, whereby any deformation of the antiskid device is prevented, even in extreme conditions.

Instead of the closures described, other closures can be used, such as, for example, snap locks or in the case of snow chains well-known rotary locks.

Instead of the chains there can also be fastened other antiskid devices to the strips and the bows, respectively, such as rubber bows or bands, wire grids, or leather tread covers. Thereby there can be attained an improved security against skidding and side-slipping of the wheel with greater rolling resistance and less smoothness of running.

I claim:

1. A removable antiskid device for use on an automobile wheel or the like and including:

two parts gripping two oppositely lying wheel segments respectively, each of said parts comprising
an outer first straight strip lying against the outside of the wheel and having two ends,
an inner second straight strip lying against the inside of the wheel and having two ends, and
flexible members connecting the ends of the inner strip with the ends of the outer strip and flexible members connecting the strips intermediate their ends, at least some of said members having antiskid characteristics, the flexibility of the members permitting them to conform to tires of various configurations, said members extending across the tire in the segment thereof defined by the ends of the first strip; and
connecting means on the outside of the wheel and connecting said outer strips of said two parts at two locations on said outer strips, which locations are adjacent the ends of the outer strips, and holding each part against the respective wheel segments, said connecting means being releasable to permit said parts to be moved off the respective wheel segments.

2. A device as set forth in claim 1, wherein said outer strips are longer than said inner strips and are less than the wheel diameter, said outer strips being approximately parallel to each other.

3. A device as set forth in claim 2, wherein the length of each outer strip is at least approximately two-thirds the wheel diameter.

4. A device as set forth in claim 3, wherein said connecting means comprises:

a lever having two ends, one of said ends having a conformation for releasably hooking onto an outer strip of one part,
means swingably connecting said lever, adjacent the other of its ends, to said outer strip of said one part, and
resilient means connecting the outer strip of the other part to said lever intermediate its ends.

5. A device as set forth in claim 4, wherein said connecting means comprises:

a second lever having two ends one of which has a conformation for releasably hooking onto an outer strip of said other part,
means swingably connecting said second lever, adjacent the other of its ends, to said outer strip of said other part, and
resilient means connecting the outer strip of said one part to said second lever intermediate its ends.

6. A device as set forth in claim 3, wherein said connecting means includes a lever having two ends and pivotally connected to the outer strip adjacent one of said ends to the outer strip of one of said parts, and connecting link means releasably connecting one lever end with the outer strip of the other part, the other end of the lever having a conformation releasably engaging the outer strip of the one part at a location spaced from said pivotal connection.

7. A device as set forth in claim 2, wherein each part includes a bow lying against the outer shoulder of the wheel and connected to the ends of the outer strip.

8. A device as set forth in claim 1, wherein said some members are chains and two of the members of each part are flexible bands, said bands being relatively thin in the dimension normal to the tire tread surface as compared to their width.

* * * * *

UNITED STATES PATENT AND TRADEMARK OFFICE
CERTIFICATE OF CORRECTION

PATENT NO. : 4,162,697
DATED : July 31, 1979
INVENTOR(S) : Peter Zinner

It is certified that error appears in the above-identified patent and that said Letters Patent are hereby corrected as shown below:

```
Column 1, line  9, --a-- should be inserted after "on".
Column 1, line 46, delete "surface" and insert --of--.
Column 1, line 48, "surfaces" should read --surface--.
Column 1, line 50, "joins" should read --join--.
Column 1, line 66, --a-- should be inserted after "is".
Column 2, line 15, "devices" should read --device--.
Column 2, line 53, "14" should read --15--.
Column 3, line 12, "other" should read --outer--.
```

Signed and Sealed this

Sixth Day of November 1979

[SEAL]

Attest:

RUTH C. MASON
*Attesting Officer*

LUTRELLE F. PARKER
*Acting Commissioner of Patents and Trademarks*